Oct. 11, 1938.  B. B. KAHN  2,132,737
STOVE
Filed April 7, 1937  3 Sheets-Sheet 1

INVENTOR
Bertrand B. Kahn
BY Maréchal & Noe
ATTORNEYS

Oct. 11, 1938.                B. B. KAHN                2,132,737
                                STOVE
                          Filed April 7, 1937          3 Sheets-Sheet 2

Oct. 11, 1938.   B. B. KAHN   2,132,737
STOVE
Filed April 7, 1937   3 Sheets-Sheet 3

INVENTOR
Bertrand B Kahn
BY Maréchal & Noe
ATTORNEYS

Patented Oct. 11, 1938

2,132,737

UNITED STATES PATENT OFFICE 2,132,737

STOVE

Bertrand R. Kahn, Cincinnati, Ohio, assignor to The Estate Stove Company, Hamilton, Ohio, a corporation of Ohio Application April 7, 1937, Serial No. 135,366

10 Claims. (Cl. 126—340)

This invention relates to stoves, and more particularly to broiler ovens for stoves.

It is the principal object to provide a simple and highly satisfactory broiler in which access is readily provided to the foodstuff supporting pan for adjustment to a desired elevation and during the cooking operation, and in which the parts may be readily removed for cleaning and the like.

Another object is to provide a withdrawable broiler in which the withdrawal mechanism and other parts of the broiling oven are separated from the cooking area and protected by a broiler liner which is readily removable for convenient cleaning.

Other objects and advantages will be apparent from the following description, the accompanying drawings, and the appended claims.

In the drawings, in which a preferred embodiment of the invention is shown,

Fig. 6 is a detail sectional view on the line 6—6 of Fig. 5.

Figure 1:
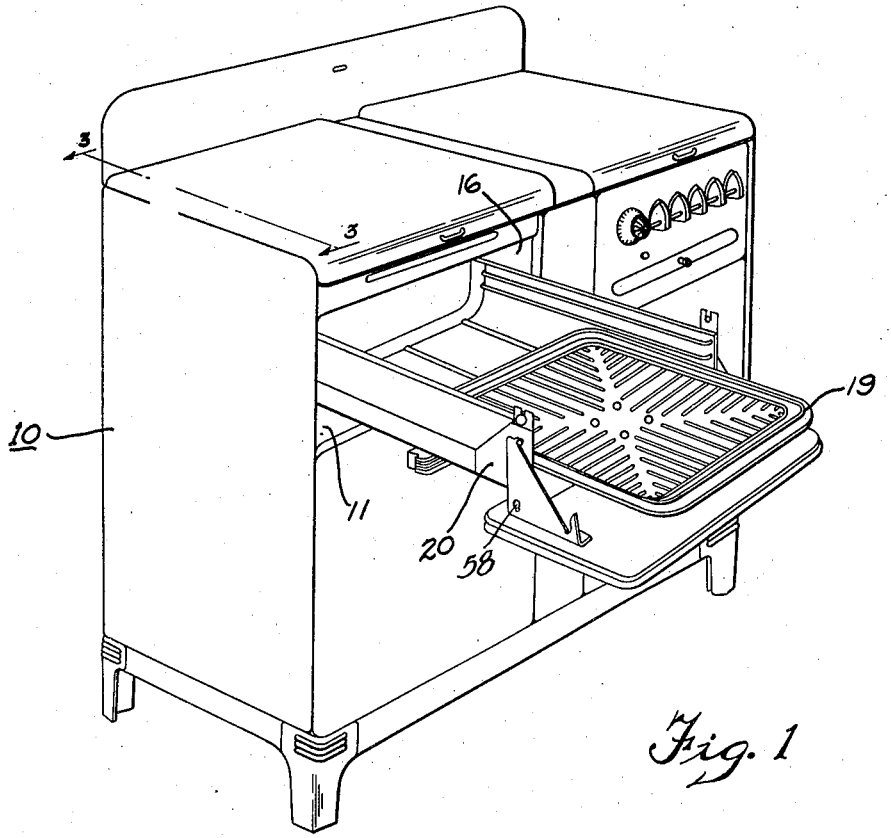
Fig. 1 is a perspective view of a stove embodying the present invention, and showing parts of the broiler mechanism in withdrawn position.
Figure 2:
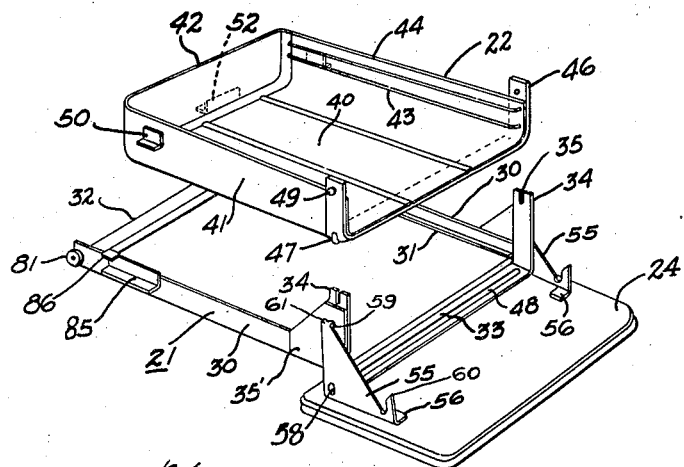
Fig. 2 is an exploded perspective view showing parts of the broiler mechanism.
Figure 3:
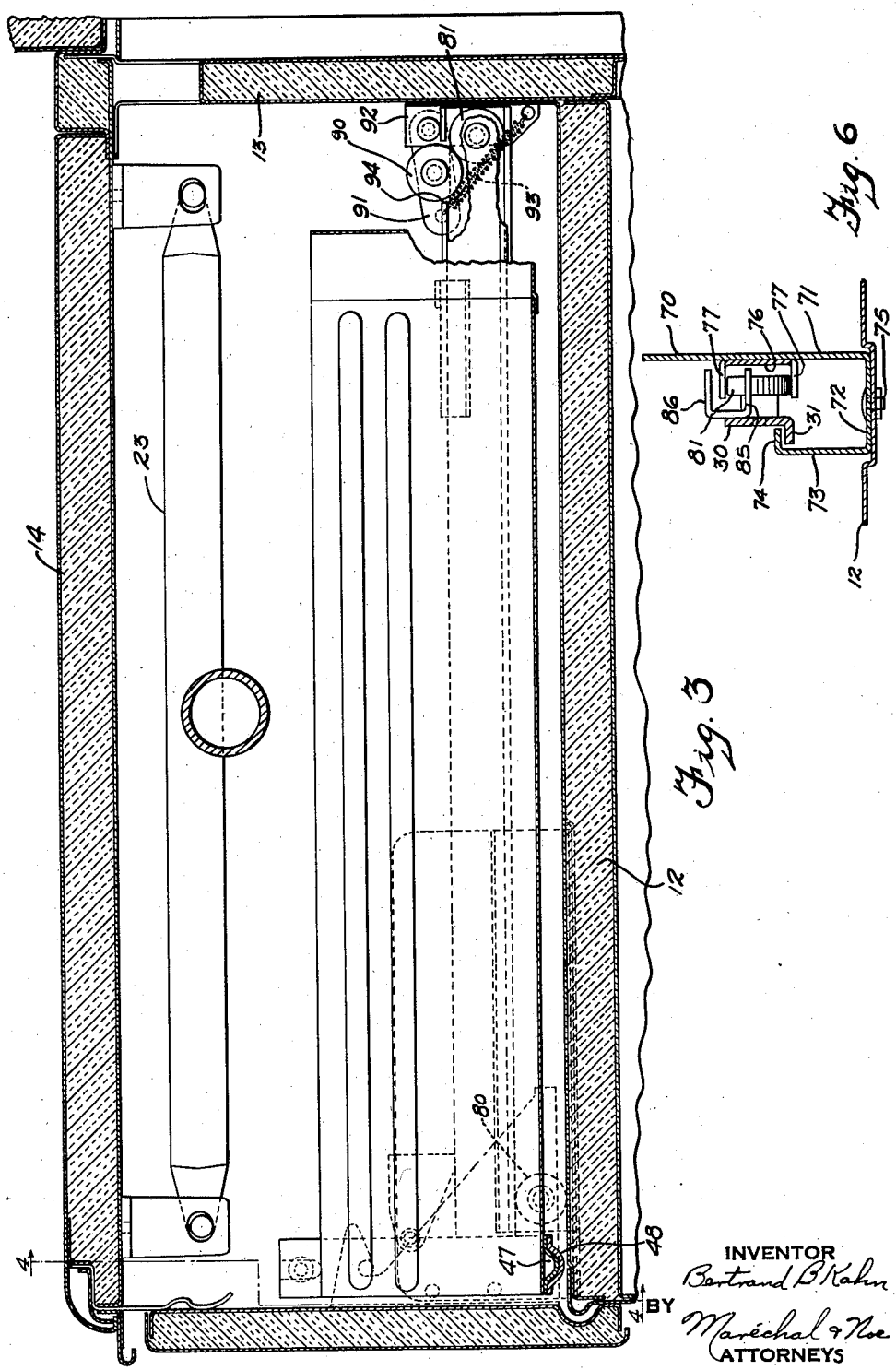
Fig. 3 is a vertical sectional view taken on the line 3—3 of Fig. 1 with the broiler mechanism in inner position.
Figures 4, 5:
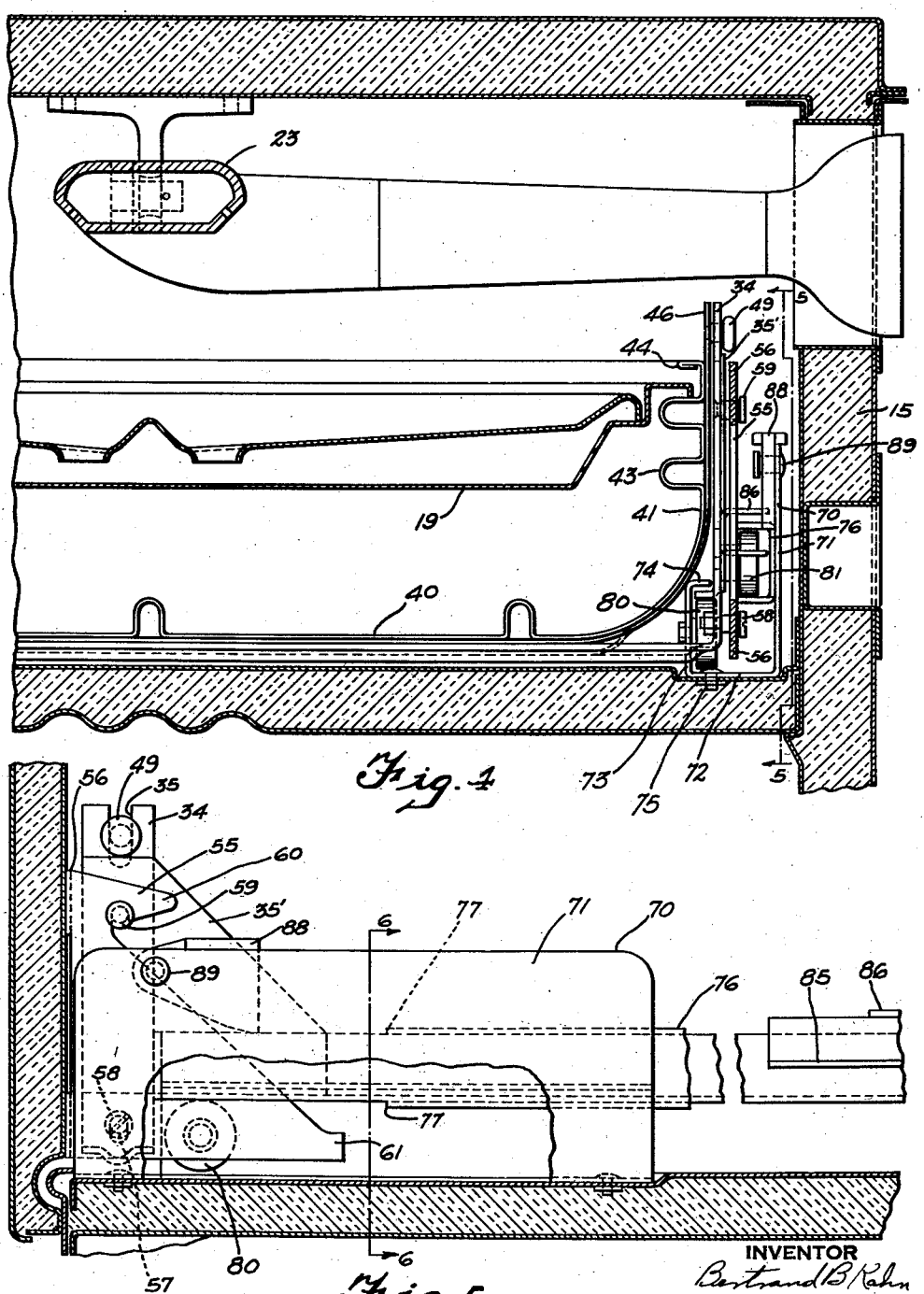
Fig. 4 is a vertical sectional view taken on the line 4—4 of Fig. 3, certain of the parts being shown on a central section line.
Fig. 5 is a vertical sectional view taken on the line 5—5 of Fig. 4.

Referring now to the drawings in detail which illustrate a preferred embodiment of the invention, 10 indicates a stove having a cooking compartment 11 adapted for broiling or the like. Cooking compartment 11 comprises bottom wall 12, rear wall 13, top wall 14 and side walls 15. These walls are preferably of double wall construction, and may be filled with suitable insulating material. The forward face of the cooking compartment is open throughout substantially all of its extent, as indicated at 16, and a movable structure, indicated generally at 20, is adapted for movement into and out of compartment 11. Movable structure 20 includes a frame portion, indicated generally at 21, and a liner, indicated generally by numeral 22, and adapted to be supported on frame structure 21 and to be readily removed therefrom when desired. A suitable heat source, such as burner 23, is positioned within cooking compartment 11.

Frame structure 21 carries at its forward end pivotally mounted closure means, indicated generally at 24, of heat insulating construction, and adapted to close front aperature 16 when the parts are in operative position.

Means are provided for mounting frame structure 21 for movement into and out of cooking compartment 11, such means comprising side rails 30, having their lower portions inwardly bent to form a horizontal lip 31. A rear cross piece 32, preferably of L-shaped cross-section to provide added strength, joins the rear ends of side pieces 30, the parts being suitably joined as by welding. The forward ends of side rails or members 30 are connected by a front cross member 33. Also located at the forward ends of side rails 30 are upwardly projecting carrier portions 34, which are formed with notches 35 at their upper ends. Front cross member 33, and carrier portions 34, are conveniently made from a single piece of material bent to U shape. These parts are attached to side rails 30, as by gusset plates 35' suitably welded in place.

Broiler liner 22 is supported and secured in position on frame 21 so that the parts move together as a unit, provision being made for the ready removal of the broiler liner from the frame by a simple lifting operation. Broiler liner 22 comprises bottom wall 40, side walls 41, and rear walls 42. The forward end, and the top of the broiler lining are open and unobstructed, for convenience in use. It is preferred to form broiler liner 22 by shaping bottom wall 40 and side walls 41 from a single piece of metal, and then attaching rear wall 42, as by welding, to complete the structure. Side walls 41 of the broiler lining are formed with broiler pan supporting ledges 43, which are preferably stamped integrally with the side walls. The top edges of the side walls are preferably inwardly turned, as indicated at 44, to assist in the positioning of the broiler pan. Surrounding the forward end of broiler liner 22 is member 46, suitably attached thereto as by welding, and which serves both to strengthen the open end of liner 22, and to assist in the attaching of liner 22 to frame 21. For this purpose, the horizontal portion of member 46 carries an integral downwardly struck rib portion 47 of curved cross section. Front cross member 33 of frame 21 has a similarly shaped downwardly struck groove portion 48, which receives portion 47, and assists in the alignment of parts. These curved portions also serve to increase the strength of the members in which they are formed. Means are provided at the upper ends of member 46, which preferably project above the top edge of liner 22, for cooperation with upwardly projecting carrier portions 34 of frame 21, and forming part of the attaching means connecting the two parts. As shown, laterally projecting pins 49 are provided on member 46. These pins have enlarged heads at their outer ends, adapted to be received in removable relation by notches 35.

Additional attaching means are provided on the sides 41 of liner 22, and on rear wall 42, and these parts cooperate with side rails 30 and rear cross piece 32 of frame 21. As illustrated, side walls 41 of liner 22 have attached to them, as by welding, angle pieces 50 having projecting horizontal portions adapted to rest on the upper edges of side members 30. Angle piece 52 on the rear wall 42 has a rearwardly projecting portion which is adapted to underlie rear cross piece 32. These parts, together with the previously described parts at the forward end, insure easy attachment and removal of the liner to the frame. In assembly, the liner is held above the frame and tilted to permit the part 52 to slide under cross bar 32. The liner is then lowered into position with brackets 50 resting on side frames 30 and with pins 49 engaging slots 35, rib 47 also being engaged in groove 48, the liner being thereby held firmly in assembled position.

Closure member 24 is supported at the forward end of frame 21 for bodily movement therewith, and also for movement relative to frame 21. As shown, closure 24 is mounted for swinging movement about a horizontal axis at the forward lower portion of frame 21, affording movement to a substantially horizontal open position providing ready access to the foodstuffs supporting pan 19 during the cooking operation and for adjustment of elevation thereof by repositioning on ledges 43. Closure hinge plates 55 are suitably attached to the rear face of closure 24, as by the welding of inwardly turned feet 56. Closure hinge plates 55 are of generally triangular shape, and are formed at their lower portions with elongated slots 57, in which are received hinge pins 58, secured to vertical carrier portions 34 of frame 21. Carrier portions 34 also carry stop pins 59 positioned above hinge pins 58. Closure hinge plates 55 have integrally formed latch portions 60 which are shaped and positioned to cooperate with stop pins 59 to hold closure member 24 in vertical position. The elongation of slots 57 allows the closure to be raised slightly so that latch portions 60 will clear stop pins 59, allowing the closure to be released and swung to horizontal position. In open position, integrally formed stop portions 61 on hinge plates 50 engage stop pins 59, thus maintaining the closure 24 in open horizontal position. A suitable handle is provided on closure 24 for the convenient performance of these operations, and also for use in moving the entire movable broiler structure in and out of broiler compartment 11, it being understood that when the handle is pulled horizontally, the broiler is withdrawn, and latch 60 releases to drop the closure only when the closure is first given an upward lifting motion.

Means are provided for supporting broiler frame 21 for ready withdrawal from cooking compartment 11, and also for complete removal of the parts when desired. The portions of the withdrawal mechanism which are fixed to stove 10 include fixed side brackets 70. Side brackets 70 are preferably formed from a single piece of metal, bent to provide outer side portions 71 which stand in vertical position and spaced a small distance from side walls 15 of cooking compartment 11. Side brackets 70 also have bottom horizontal portions 72, and inner vertical portions 73. These latter portions terminate at their upper ends in inwardly bent portions 74 forming a horizontal flange. Brackets 70 are fastened to the bottom wall 12, as by bolts 75. Fixed guide members 76 are fastened to the outer side portions 71 of side brackets 70 and have upper and lower horizontal flanges terminating short of the forward face of compartment 11 as shown at 77. Guide members 76 extend rearwardly beyond side portions 71, preferably extending the full depth of compartment 11, and being fastened to rear wall 13.

Sliding withdrawal movements of frame 21 and associated parts are facilitated by the provision of anti-friction means including two sets of rollers. These comprise forward fixed rollers 80, mounted on inner vertical portion 73 of side brackets 70; and rear movable rollers 81, mounted on the rear portions of side rails 30 of frame 21. Fixed forward rollers 80 are positioned to underlie the inturned lips 31 formed on side rails 30, and it will be noted that these inturned lips 31 underlie and are spaced from the flange portions 74 on side brackets 70. This relationship provides for guiding the side rails and prevents undue displacement of the parts. Movable wheels 81 operate within the fixed guide members 76, which are preferably of channel form. Thus during withdrawal movements of frame 21, side rails 30 move over fixed forward wheels 80 and movable wheels 81 roll along fixed guide members 76.

Additional means are provided to guide the parts and to prevent undue lateral movement. These means comprise horizontally projecting strips 85, suitably secured to the outer vertical faces of side rails 30 adjacent the rearward portions thereof, and positioned to lie within the channels of fixed guide members 76, and to have a small clearance in normal position with respect to the vertical portions thereof.

Provision is made to limit the withdrawal of frame 21 under normal operation, but to provide for complete separation and removal of the parts when desired. For this purpose, stops 86 are provided on side rails 30 of frame 21. As shown, these stops project laterally from the side rails, and overlie the tops of fixed guide members 76. Cooperating with stops 86 are dogs 88, pivotally mounted at 89 on the outer vertical portions of fixed side brackets 71, lying in the path of stops 86, and determining the normal outer limit of movement. When it is desired to completely separate the parts, dogs 88 are manually lifted about their pivots to a position where stops 86 can pass clear of them.

After complete removal, provision is made for ready reassembly of the parts. As described, the upper and lower sides of the channels of fixed guide members 76 terminate short of the forward face of cooking compartment 11, as indicated at 77, and to reassemble the parts, it is only necessary to place lips 31 of side rails 30 on fixed forward rollers 80, and underneath flange portions 74. Rearward movement of frame member 21 then brings movable rollers 81 into the supporting channels 76.

In order to insure complete closing of the broiler compartment during use, detent means are provided which urge the parts toward closed position during the last part of the inward travel of frame 21, and which also releasably hold the parts in closed position until pulled open. These detent means are mounted in the rear of cooking compartment 11, and are positioned to cooperate with movable rollers 81 when the parts are in operative position and include detent wheels 90 mounted for rotation upon arms 91. Arms 91 are pivoted at their rearward ends to brackets 92 fixed to rear wall 13, the arms 91 projecting forwardly to movably position detent wheels 90 in the path of movable wheels 81. The forward ends of arms 91 are downwardly urged by springs 93, the opposite ends of which are secured in holes in brackets 92. Suitable stops are provided to limit the downward motion of arms 91, and the top horizontal channel side of fixed guide member 76 is cut away, as indicated at 94, and detent wheel 90 works through this aperture. In operation, as frame 21 is being pushed in and approaches its inner operative position, wheel 81 engages detent wheel 90 causing arm 91 to rise, the operator pushing sufficiently to overcome the tension of spring 93. After movable wheel 81 is moved rearwardly sufficiently so that its center is behind that of detent wheel 90, the downward pull of spring 93 exerts a rearward thrust on frame 21, and thus releasably retains the frame in inner position.

In operation of the stove, there is seldom any occasion to remove the broiler frame 21 from the cooking compartment 11. During broiling, however, there is likely to take place a sufficient amount of spattering so that frequent cleaning of the broiler parts is necessary. The broiler liner 22, built in accordance with the present invention, can be readily removed for such cleaning, and it is also to be noted that broiler liner 22 affords protection to the withdrawal mechanism, so that these parts seldom require attention. To remove liner 22, the frame 21 is withdrawn to its outer position, and closure 24 is swung about its hinges to open position. Then a lifting motion, applied as to the forward ends of side walls 44, will separate pins 49 from notches 35. During such lifting, the liner pivots about side supports 50, resting on the tops of frames 30, and rear support 52 moves downwardly out of contact with rear cross piece 32. After the forward end has been elevated sufficiently to clear the forward parts of the frame, the liner may be pulled forwardly a short distance and then lifted completely free of the frame structure. To replace the liner, the procedure is reversed, and the supports are so arranged that the liner is guided easily and quickly to proper operative position. It will be noted that in the embodiment illustrated, the proportioning of liner 22 and its associated parts is such that it cannot be lifted out of operative position unless closure 24 is first opened.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A stove of the character described comprising a cooking compartment, a frame mounted for movement into and out of said compartment, a liner separate from said frame, means connecting said liner to said frame for movement therewith and for ready detachment therefrom, a food support member, and means on said liner for supporting said food support member at a desired elevation.

2. A stove of the character described comprising a cooking compartment, a frame mounted for movement into an operative position in said compartment, and for movement out of said compartment to an inoperative position, a liner separate from said frame, means connecting said liner to said frame for movement therewith and for ready detachment therefrom, and a closure for said opening carried by said frame and adapted to close said compartment when said frame is moved into operative position within said compartment.

3. A stove of the character described comprising a cooking compartment, a broiler frame mounted for movement into and out of said compartment, a closure member for said compartment hingedly mounted on said frame adapted to close said compartment when the frame is moved into said compartment, said closure being movable to an open position on said frame, a liner, and means for mounting said liner on said frame for movement therewith and providing for removal therefrom when said closure member is moved to said open position.

4. Apparatus of the character described comprising a cooking compartment, a frame mounted for movement into and out of said compartment, a closure member for said compartment hingedly mounted on said frame and movable to an open position, a liner having an open end, means for mounting said liner on said frame with its open end adjacent said closure member for movement with said frame, said mounting means providing for removal of said liner from said frame when said closure member is moved to its open position on the frame, a food support member, and means on said liner for carrying said food support member and providing for removal thereof from said liner when said closure is moved to its open position.

5. Apparatus of the character described comprising a cooking compartment, a frame mounted for movement into operative position in said compartment and out of said compartment into inoperative position, a closure member for said compartment carried by said frame and adapted to close said compartment when said frame is moved into operative position within said compartment, detent means permanently positioned within said compartment, means for mounting said detent means within said compartment providing for yielding bodily movement thereof, and means on said frame adapted to engage said detent means in a predetermined position of the frame, said detent means cooperating with said frame to yieldingly maintain said frame in its operative position.

6. In a stove of the character described, a broiler compartment, a supporting frame mounted for sliding movement in and out of said compartment, a closure member for said compartment hingedly connected to the forward end of said supporting frame, a broiler liner mounted on said supporting frame and removable therefrom in the open position of said closure for cleaning and the like, means on the sides of said liner adjacent the rear thereof for engaging the frame to support said liner thereon, and means on said liner adjacent the forward part thereof detachably received in said frame for holding the liner in fixed relative position when mounted within said frame.

7. In a stove having a cooking compartment, a broiler within said cooking compartment comprising a withdrawable supporting frame having side members, a removable broiler lining having side walls and being open at its front to provide for receiving and withdrawing a food supporting member longitudinally, and means for detachably mounting said broiler lining on said supporting frame for movement therewith, said means including means on the side walls of said broiler liner cooperating with the side members of said supporting frame.

8. In a stove having a cooking compartment, a broiler within said cooking compartment comprising a withdrawable supporting frame having side members and upwardly projecting carrier portions adjacent the forward end of said side members, a removable broiler lining having side walls, and means for detachably mounting said broiler lining on said supporting frame for movement therewith, said means including means on the side walls of said broiler liner adjacent the forward end thereof cooperating with the upwardly projecting carrier portions of said supporting frame.

9. In a stove having a cooking compartment, a broiler within said cooking compartment comprising a withdrawable supporting frame including side members, a rear cross piece connecting said side members, and upwardly projecting carrier portions adjacent the forward end of said side members; a removable broiler lining having bottom, side and rear walls; and means for detachably mounting said broiler lining on said supporting frame for movement therewith, said means including means on the rear wall of said broiler lining cooperating with the rear cross piece of said supporting frame, means on the side walls of said broiler liner and intermediate the ends thereof cooperating with the side members of said supporting frame, and means on the side walls of said broiler liner adjacent the forward ends thereof cooperating with the upwardly projecting carrier portions of said supporting frame.

10. Apparatus of the character described comprising a cooking compartment having an opening in a wall thereof, food supporting means in said cooking compartment, and means providing for sliding movement of said food supporting means into and out of said cooking compartment, said last-named means comprising anti-friction supports mounted in said compartment and underlying said food supporting means, channel members mounted in said compartment and positioned laterally of said food supporting means, anti-friction means mounted on the rear portions of said food supporting means and received by said channel members, and guide members mounted on said food supporting means forwardly of said antifriction means and projecting into said channel members to a position of close clearance with the walls of said guide members to limit lateral and upward movement of said food supporting means.

BERTRAND B. KAHN.